(12) United States Patent
Shih et al.

(10) Patent No.: US 7,539,011 B2
(45) Date of Patent: May 26, 2009

(54) MULTI-DIRECTIONAL SLIDING MODULE AND APPLICATION THEREOF

(75) Inventors: Chin-Chung Shih, Taoyuan (TW); Ching-Shih Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 251 days.

(21) Appl. No.: 11/617,095

(22) Filed: Dec. 28, 2006

(65) Prior Publication Data
US 2007/0153465 A1    Jul. 5, 2007

(30) Foreign Application Priority Data
Dec. 30, 2005    (TW)    .............................. 94147796 A

(51) Int. Cl.
G06F 5/00    (2006.01)
G09G 5/00    (2006.01)

(52) U.S. Cl. ...................... 361/686; 345/169

(58) Field of Classification Search ................ 361/756, 361/681, 683, 686; 439/10, 11, 13, 326; 455/575.1, 575.4; 220/345.1; 345/169
See application file for complete search history.

(56) References Cited

U.S. PATENT DOCUMENTS

| | | | |
|---|---|---|---|
| 3,577,930 A * | 5/1971 | Rooklyn | 104/173.1 |
| 5,540,319 A * | 7/1996 | Orisaka et al. | 198/465.3 |
| 7,410,360 B2 * | 8/2008 | Pan | 439/10 |
| 7,422,436 B2 * | 9/2008 | Lee | 439/10 |
| 7,426,115 B2 * | 9/2008 | Shih et al. | 361/756 |
| 2005/0070348 A1 * | 3/2005 | Lee et al. | 455/575.4 |
| 2005/0104857 A1 * | 5/2005 | Jacobs et al. | 345/169 |
| 2005/0125570 A1 | 6/2005 | Olodort et al. | |
| 2006/0061943 A1 * | 3/2006 | Santos et al. | 361/679 |
| 2006/0063569 A1 * | 3/2006 | Jacobs et al. | 455/575.1 |
| 2006/0226150 A1 * | 10/2006 | Pan | 220/345.1 |
| 2008/0186663 A1 * | 8/2008 | Chen | 361/681 |

FOREIGN PATENT DOCUMENTS

| | | |
|---|---|---|
| CN | 1713805 A | 12/2005 |
| WO | 03050665 A1 | 6/2003 |

* cited by examiner

*Primary Examiner*—Chandrika Prasad

(57) ABSTRACT

A multi-directional sliding module for a portable device is described. The multi-directional sliding module includes a slide, a first track, and a second track. The first track and the second track are disposed on a single plane of a portable device and form a predetermined angle therebetween to allow a first electronic module sliding along at least two directions on a second electronic module of the portable device. When the first electronic module is slid out along the first track, the portable device is operated in a mobile phone mode. When the first sliding electronic module is slid out along the second track, the portable device is operated in a typing mode.

22 Claims, 5 Drawing Sheets

MULTI-DIRECTIONAL SLIDING MODULE AND APPLICATION THEREOF

RELATED APPLICATIONS

The present application is based on, and claims priority from, Taiwan Application Serial Number 94147796, filed Dec. 30, 2005, the disclosure of which is hereby incorporated by reference herein in its entirety.

FIELD OF THE INVENTION

The present invention generally relates to a multi-directional sliding module. More particularly, this invention relates to a multi-directional sliding module moving on a single surface for a portable electronic device.

BACKGROUND OF THE INVENTION

Since wireless communication technology is highly developed, mobile phones are becoming increasingly light and easy to hold. Nowadays, most people use mobile phones to communicate with others. Therefore, the mobile phone has become a necessary electronic device in people's lives.

Due to the popularity of mobile phones, mobile phone manufacturers are working extremely hard to increase mobile phone functions in order to satisfy various requirements desired by users. For example, some of the mobile phones provide PDA functions, such as address book, calendar, minutes and/or agendas. Some mobile phones provide electronic games therein for the users to play during their idle time. Further, some mobile phones have digital cameras thereon so that users can take beautiful pictures to share with their friends.

However, a current mobile phone generally has a size smaller than that of a palm, and especially, a smaller mobile phone only has a size almost similar to that of an egg. Therefore, the surface area for the keyboard and display on a mobile phone is limited. Integrating all the foregoing functions into such a small mobile phone is difficult. To increase the available surface area, some mobile phones are designed to dispose the keyboard and the display respectively on two electronic modules, which are connected to each other via a sliding mechanism, so as to construct, for example, a slide cell phone including a sliding keyboard and a sliding display.

In the meantime, some of the mobile phone manufacturers design a keyboard module, which has a key arrangement similar to that of a standard QWERTY keyboard, to prevent users from changing their input habits and thus to facilitate their typing speed, and also utilize a display with a landscape view for user to type like using a computer. However, the quasi QWERTY keyboard on the mobile phones is not suitable to be used for dialing telephone numbers. Therefore, some of the mobile phone manufactures further design a PDA mobile phone with two keyboard modules. The PDA mobile phone with two keyboard modules normally adopts three electronic modules stacked together for respectively disposing the display, the quasi QWERTY keyboard and the telephone keyboard thereon, and includes different sliding modules coupling the three electronic modules together so as to enable the display, the quasi QWERTY keyboard and the telephone keyboard to be opened in different directions.

However, while the mobile phone is getting small, the mobile phone with three stacked electronic modules is not only increased in size and weight but also inconvenient to be carried. Therefore, there is a need to reduce the thickness of the mobile phone, which is able to be opened in different directions, such that the mobile phone could be reduced in size while providing various input functions.

SUMMARY OF THE INVENTION

It is an objective of the present invention to provide a multi-directional sliding module whose slide can be operated along different directions on a single plane.

It is another objective of the present invention to provide a multi-directional sliding module coupled with two electronic modules of a portable electronic device so that the two electronic modules can horizontally and vertically be opened by the user conveniently.

It is yet another objective of the present invention to provide a multi-directional sliding module with a dynamic slide using an attracting force, such as the magnetic force, to engage with the track in a part route thereof to improve the sliding stability of two electronic modules of an electronic device.

To accomplish the above objectives, the present invention provides a multi-directional sliding module. The multi-directional sliding module is preferably utilized in a portable electronic device having a first electronic module and a second electronic module able to slide on each other. The multi-directional sliding module includes a first track, a second track and a slide. The first track and the second track are formed on the first electronic module, and are connected together on a single plane with a predetermined angle formed therebetween. The slide is connected to the second electronic module and can move along the first track and the second track such that the second electronic module is able to be slid out from the first electronic module so as to expose a numerical keypad or a quasi QWERTY keyboard. The predetermined angle is preferably about 90 degrees. When the first electronic module and the second electronic module are slid out along the first track, e.g. along the long side of the portable electronic device, the portable electronic device exposes a numerical keypad on the second electronic module to operate the portable electronic device as a mobile phone. When the first electronic module and the second electronic module are slid out along the second track, e.g. along the short side of the portable electronic device, the portable electronic device exposes a quasi QWERTY keyboard on the second electronic module to allow a user to type and the aspect ratio of a display on the first electronic module is similar to that of a computer display.

The multi-directional sliding module can further include a dynamic sliding mechanism with a third track, an opening formed on the third track, a dynamic slide, and a guiding device for guiding the dynamic slide into the third track through the opening while the dynamic slide is aligned with the opening so as to allow the dynamic slide sliding on the third track. In addition, the third track can further comprise another opening to allow the dynamic slide to escape from the third track.

The multi-directional sliding module can further utilize a wedge-shaped block disposed above the anther opening to push the dynamic slide out of the third track while the dynamic slide is aligned with the anther opening. The multi-directional sliding module can further utilize a magnetic device disposed above the another opening, and the dynamic slide and the magnetic device are made of a magnetic material. In addition, the adjacent surfaces of the dynamic slide and the magnetic device possess the same polarity to push the dynamic slide out of the third track. In an embodiment, the dynamic slide is made of a magnetic material and the guiding device is made of a ferromagnetic material. In another embodiment, the dynamic slide is made of a ferromagnetic material and the guiding device is made of a magnetic material. In further another embodiment, the dynamic slide and the guiding device are made of a magnetic material, and the adjacent surfaces thereof possess different polarities.

Accordingly, the multi-directional sliding module according to the preferred embodiment of the present invention can easily be installed between the first electronic module and the second electronic module and enable the first electronic module and the second electronic module to slide on a single plane along at least two directions. In conjunction with the dynamic sliding mechanism, the dynamic slide engages with the track in a part route of the track while the first electronic module is sliding on the second electronic module so that the moving stability between the first electronic module and the second electronic module of the portable electronic device can therefore be increased.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The following description is currently the best implementation of the present invention. This description is not to be taken in a limiting sense but is made merely to describe the general principles of the invention. The scope of the invention should be determined by referencing the appended claims.

Figure 1:
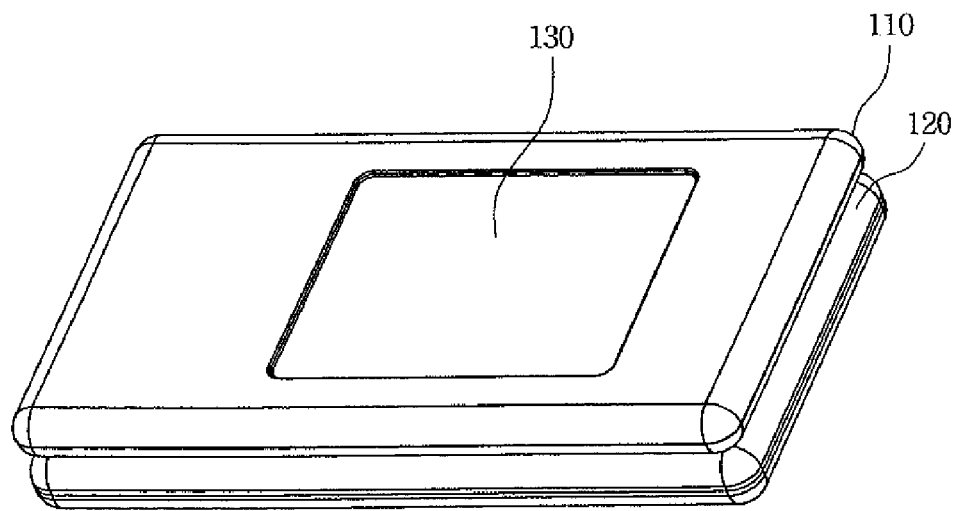
FIG. 1 illustrates a portable electronic device with a multi-directional sliding module according to a first embodiment of the present invention.

FIG. 1 illustrates a portable electronic device with a multi-directional sliding module according to a first embodiment of the present invention. The portable electronic device includes a first electronic module 110 and a second electronic module 120. A display 130 is disposed on the first electronic module 110.

Figure 2A:
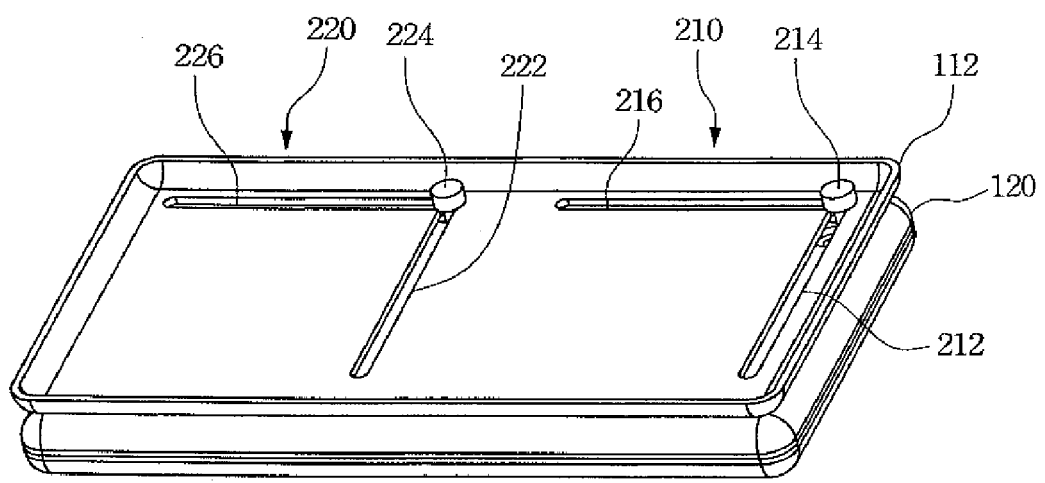
FIGS. 2A to 2C illustrate interior components of the first preferred embodiment of FIG. 1.
Figure 2B:
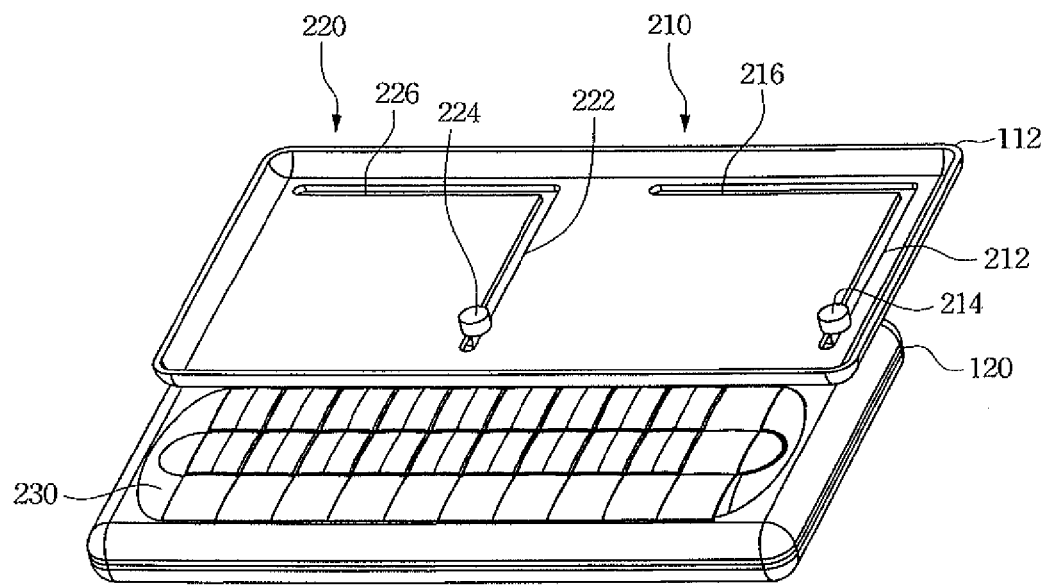
Figure 2C:
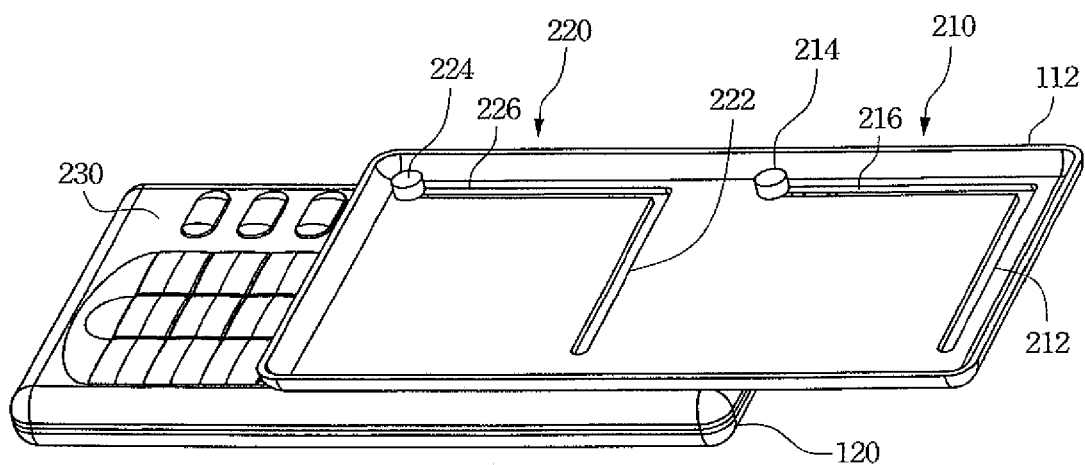

FIGS. 2A to 2C show interior components of the portable electronic device according to the first embodiment for illustrating the sliding procedure thereof. For clear illustration to the sliding procedure, a part of the first electronic module 110 is removed to expose a first shell 112, and a first sliding mechanism 210 and a second sliding mechanism 220 therein. The first sliding mechanism 210 includes a first slide 214, a first track 216, and a second track 212. The second sliding mechanism 220 includes a second slide 224, a first track 226 and a second track 222.

The first track 216 and the second track 212 are connected to each other with a predetermined angle, more preferably a right angle, formed therebetween. In this embodiment, the first track 216 and the second track 212 are connected together in an "L" shape. However, in other embodiment, the first track 216 and the second track 212 can be connected together in other shapes such as "V", "X", "+" and "T" shapes. The first slide 214 can move along the first track 216 and the second track 212. In addition, the first track 226 and the second track 222 are also connected to each other with the abovementioned predetermined angle, more preferably the right angle, formed therebetween such that the second slide 224 can move along the first track 226 and the second track 222.

Accordingly, the first shell 112 of the first electronic module 110 can move on the second electronic module 120 along at least two directions through the first sliding mechanism 210 and the second sliding mechanism 220.

Referring to FIG. 2B, while the first shell 112 is moved along the second track 212 and the second track 222, such as along the short side of the portable electronic device, a part of operating components on the surface 230 of the portable electronic device, e.g. a quasi QWERTY keyboard or a touch pad, can be exposed. In this open configuration, the display 130 as shown in FIG. 1 presents a transverse display mode, which has an aspect ratio similar to a computer display, for users to conveniently read information thereon, and the exposed quasi QWERTY keyboard can enable the users to type quickly.

Referring to FIG. 2C, while the first shell 112 is moved along the first track 216 and the first track 226, such as along the long side of the portable electronic device, a part of operating components on the surface 230 of the portable electronic device, e.g. a telephone keyboard or a touch pad, can be exposed. In this open configuration, the portable electronic device operates in a mobile phone mode for users to conveniently dial the telephone number and answer the telephone.

Therefore, the two electronic modules of the portable electronic device according to the present invention can easily be moved relative to each other along at least two directions so as to expose a suitable operating interface for the user to operate the portable electronic device. In addition, since all of the tracks and the slides work in the same plane, the portable electronic device can utilize only two electronic modules to provide a horizontal operating mode and a vertical operating mode, that is, a typing mode and a mobile phone mode. In comparison with the conventional three-stacked portable electronic device, the portable electronic device according to the present invention can effectively reduce the thickness and the size thereof.

Figure 3:
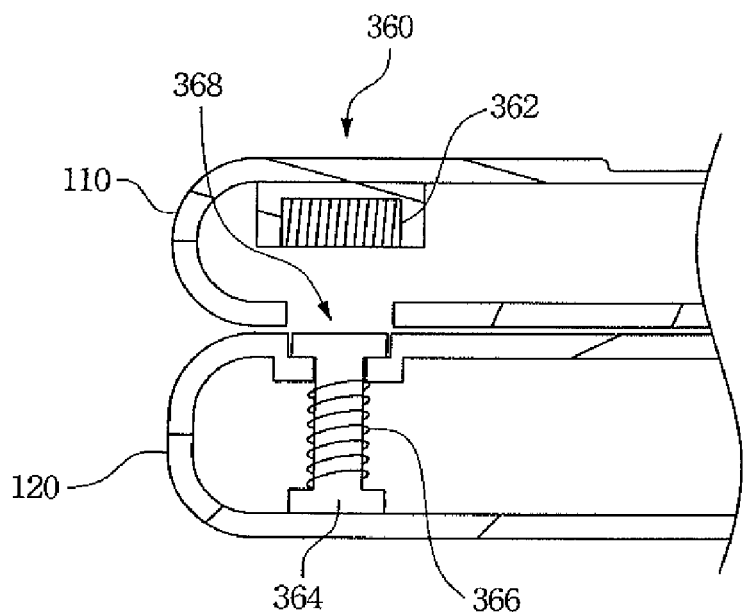
FIG. 3 illustrates a dynamic sliding mechanism of the multi-directional sliding module according to one embodiment of the present invention.

FIG. 3 illustrates a dynamic sliding mechanism of the multi-directional sliding module according to one embodiment of the present invention. The dynamic sliding mechanism 360 includes a guiding device 362, a dynamic slide 364, and tracks (referring to FIGS. 4A to 4C). While the dynamic slide 364 is aligned with the guiding device 362, the dynamic slide 364 is able to be attracted into the track through the opening 368 of the track so as to increase the sliding reliability between the first electronic module 110 and the second electronic module 120. The dynamic sliding mechanism 360 further includes an elastic device 366 to assist the dynamic slide 364 to return back to the second electronic module 120. The guiding device 362 is preferably an attracting device so that the dynamic slide 364 and the guiding device 362 can attract each other by an attracting force. For example, the dynamic slide 364 is made of a magnetic material and the guiding device 362 is made of a ferromagnetic material, the dynamic slide 364 is made of a ferromagnetic material and the guiding device 362 is made of a magnetic material, or both the dynamic slide 364 and the guiding device 362 are made of a magnetic material and adjacent surfaces thereof possess different polarities.

Figure 4A:
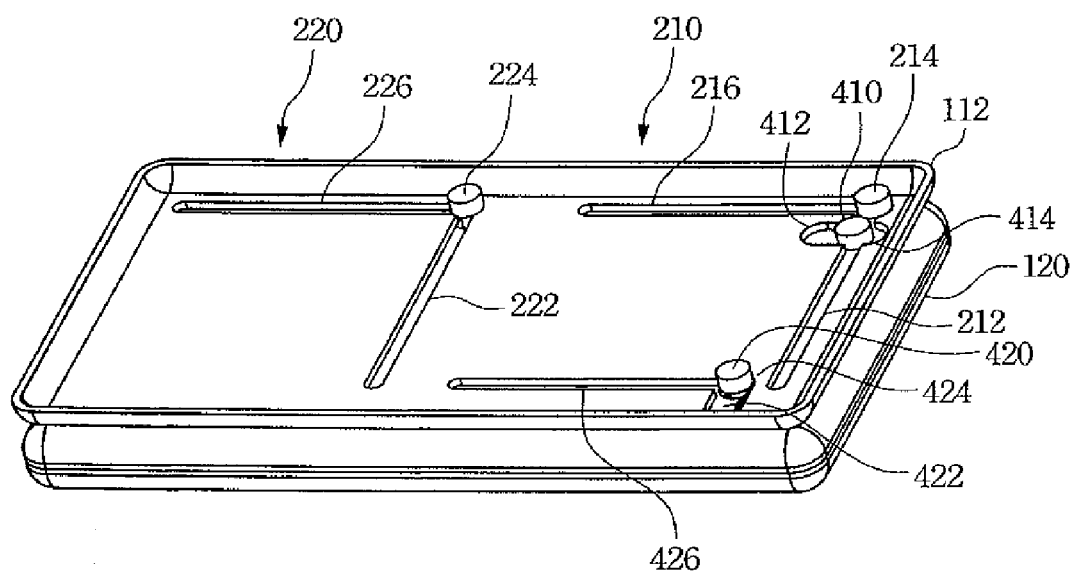
FIGS. 4A to 4C illustrate interior components of a portable electronic device with a multi-directional sliding module according to a second embodiment of the present invention.
Figure 4B:
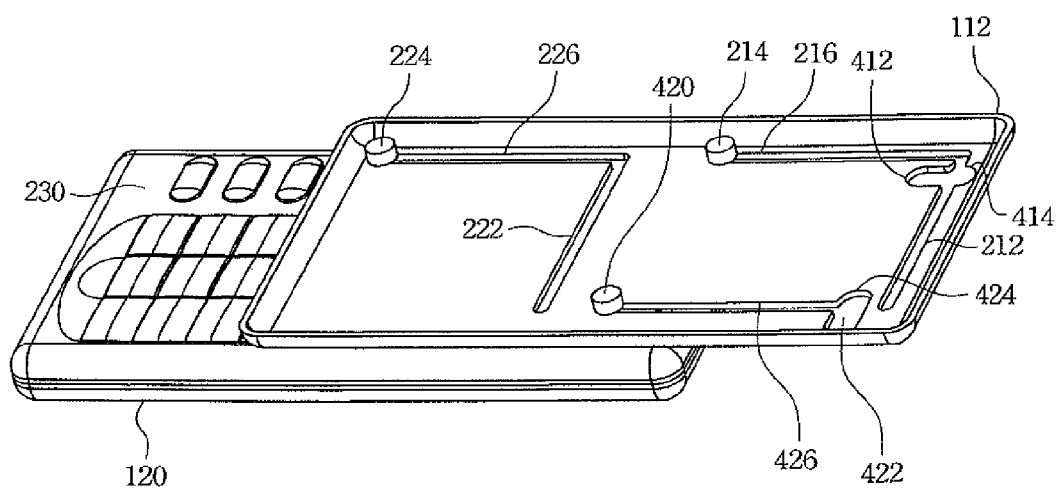
Figure 4C:
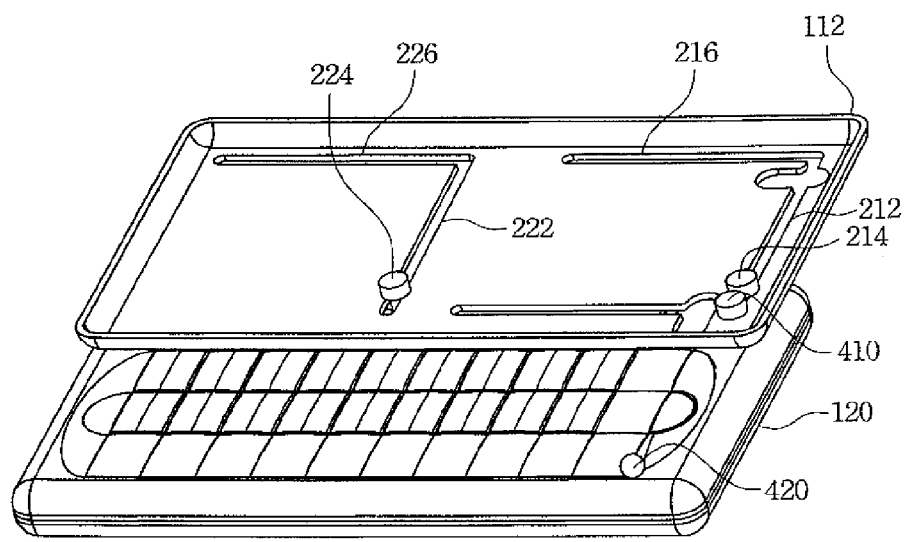
Figure 5:
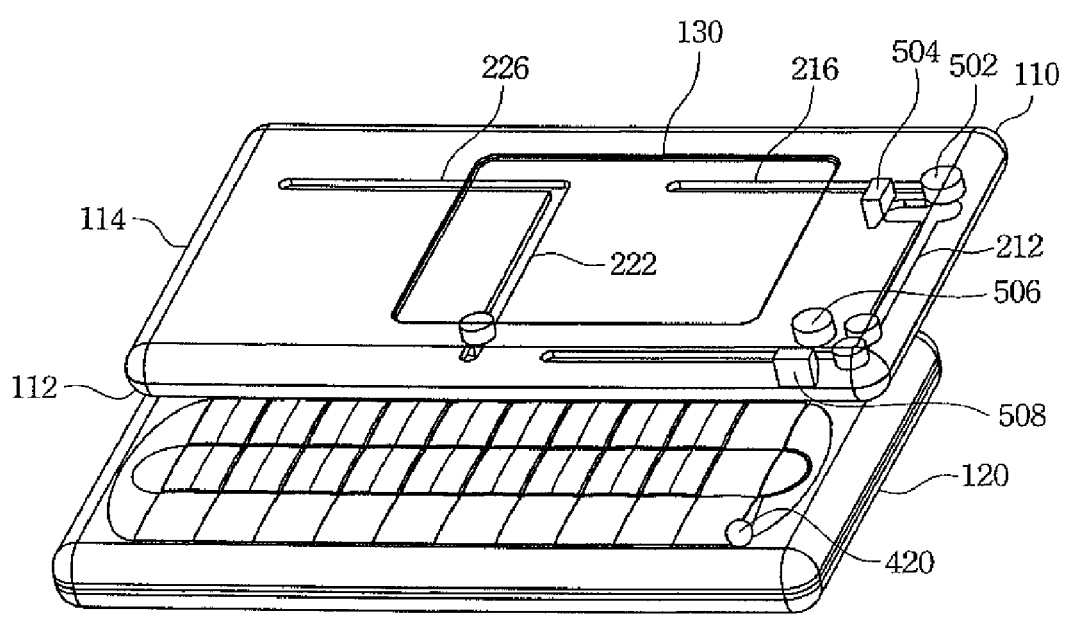
FIG. 5 illustrates components of the second preferred embodiment of the portable electronic device with the multi-directional sliding module illustrated in FIGS. 4A to 4C.

FIGS. 4A to 4C show interior components of a portable electronic device with a multi-directional sliding module according to a second embodiment of the present invention and FIG. 5 illustrates components disposed within the portable electronic device according to the second embodiment. Referring to FIG. 4A to 5, the dynamic sliding mechanism 360 can combine with the foregoing first sliding mechanism 210 and/or the second sliding mechanism 220 for coupling the first electronic module 110 and the second electronic module 120.

A first sliding slide 410 can slide along the first track 216 and the second track 212 of the first sliding mechanism 210, and the second track 212 further includes an opening 414 and an opening 412. A guiding device 502 is disposed above the opening 414 to guide the first dynamic slide 410 into the second track 212 of the first sliding mechanism 210 from the surface 230 of the second electronic module 120 so that the first dynamic slide 410 can be moved along the second track 212.

Referring to FIGS. 4C and 5, when the first shell 112 is slid along the second track 212 and the second track 222 after the guiding device 502 attracts the first dynamic slide 410 into the second track 212, the first slide 214 and the first dynamic slide 410 can effectively couple the first electronic module 110 to the second electronic module 120 such that the first electronic module 110 can be slid relative to the second electronic module 120. In conjunction with the second sliding mechanism 220, the first electronic module 110 and the second electronic module 120 can utilize the first slide 214, the second slide 224 and the first dynamic slide 410 to slide on the same plane and thus to improve the sliding stability thereof.

Referring to FIG. 4B, when the first shell 112 is slid along the first track 216 and the first track 226, the incline of a wedge-shaped block 504 (shown in FIG. 5) disposed above the opening 412 pushes the first dynamic slide 410 back to the surface 230 of the second electronic module 120 so as to prevent the first dynamic slide 410 from interference with the movement of the first shell 112. At the same time, a second dynamic slide 420 is attracted by the guiding device 506 (shown in FIG. 5) disposed above an opening 424 to enter into a third track 426 through the opening 424 and then slides along the third track 426. The first electronic module 110 and the second electronic module 120 can simultaneously utilize the first slide 214, the second slide 224 and the second dynamic slide 420 to slide on the same plane and thus to improve the sliding stability thereof.

Referring to FIG. 5, a wedge-shaped block 508 is disposed above an opening 422 of the third track 426. When the second dynamic slide 420 is slid toward a direction parallel to the second track 212, the wedge-shaped block 508 can push the second dynamic slide 420 back to the surface 230 of the second electronic module 120. Therefore, in conjunction with the dynamic sliding mechanism, the multi-directional sliding module according to the preferred embodiment of the present invention can not only effectively be opened in multiple directions but also increase the sliding stability for the portable electronic device.

When the first dynamic slide 410 and the second dynamic slide 420 are made of a magnetic material, other magnetic devices (not shown) can be disposed above the opening 412 and the opening 422 and face to the first dynamic slide 410 and the second dynamic slide 420 respectively for replacing or assisting the elastic device 366, the wedge-shaped block 504 and the wedge-shaped block 508 to push the first dynamic slide 410 and the second dynamic slide 420 back into the second electronic module 120. Preferably, the surfaces of the magnetic devices facing to the first dynamic slide 410 and the second dynamic slide 420 respectively possess the same polarities as adjacent surfaces of the first dynamic slide 410 and the second dynamic slide 420.

Accordingly, the multi-directional sliding module according to the preferred embodiment of the present invention not only enables the electronic modules of a portable electronic device to be opened along at least two directions and but also increases the sliding stability for the electronic modules of the portable electronic device. Therefore, the functionalities of the portable electronic device can be improved and the portable electronic device can be operated by users more easily.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A multi-directional sliding module for coupling a first electronic module and a second electronic module of a portable electronic device, comprising:
    a first track;
    a second track connected to the first track on a single plane with a predetermined angle formed therebetween;
    a slide for moving along the first track and the second track;
    a third track with an opening formed thereon;
    a dynamic slide movable relative to the first electronic module and the second electronic module respectively; and
    a guiding device for guiding the dynamic slide from an outside of the third track into the third track through the opening while the dynamic slide is aligned with the opening.

2. The multi-directional sliding module of claim 1, wherein the predetermined angle is about 90 degrees.

3. The multi-directional sliding module of claim 1, further comprising:
    a second opening formed on the second track;
    a second dynamic slide; and
    a second guiding device for guiding the second dynamic slide into the second track through the second opening while the second dynamic slide is aligned with the second opening.

4. The multi-directional sliding module of claim 1, wherein the first track, the second track and the third track are formed on the single plane, and the third track is parallel to at least one of the first track and the second track.

5. The multi-directional sliding module of claim 1, wherein the dynamic slide is attracted by the guiding device so that the dynamic slide is movable relative to the first electronic module and the dynamic slide is movable along the third track when the dynamic slide is guided into the third track.

6. A portable electronic device, comprising:
    a first electronic module;
    a second electronic module;
    a multi-directional sliding module coupling the first electronic module to the second electronic module for allowing the first electronic module to slide relative to the second electronic module, wherein the multi-directional sliding module further comprises:
    a first track formed on the first electronic module;

a second track formed on the first electronic module and connected to the first track on a single plane with a predetermined angle formed therebetween;

a slide connected to the second electronic module and moved along the first track and the second track when the first electronic module slide relative to the second electronic module;

a third track formed on the first electronic module;

a first opening formed on the third track;

a dynamic slide movable relative to the first electronic module and the second electronic module respectively; and a guiding device for guiding the dynamic slide from an outside of the third track into the third track through the first opening while the dynamic slide is aligned with the first opening.

7. The portable electronic device of claim 6, wherein the predetermined angle is about 90 degrees.

8. The portable electronic device of claim 6, wherein the second electronic module further includes a keyboard module with a numerical keypad for dialing telephone numbers and a quasi QWERTY keyboard for typing.

9. The portable electronic device of claim 8, wherein the second electronic module is able to be slid out from the first electronic module along the first track to expose the numerical keypad.

10. The portable electronic device of claim 9, wherein the second electronic module is able to be slid out from the first electronic module along the second track to expose the quasi QWERTY keyboard.

11. The portable electronic device of claim 6, wherein the third track further comprises a second opening formed thereon for allowing the dynamic slide to escape from the third track.

12. The portable electronic device of claim 11, further comprising an elastic device coupled to the dynamic slide for pushing the dynamic slide out of the third track.

13. The portable electronic device of claim 11, further comprising a wedge-shaped block disposed above the second opening for pushing the dynamic slide out of the third track while the dynamic slide is aligned with the second opening.

14. The portable electronic device of claim 11, further comprising a magnetic device disposed above the second opening, wherein the dynamic slide and the magnetic device are made of a magnetic material, and adjacent surfaces thereof possess a same polarity.

15. The portable electronic device of claim 6, wherein the dynamic slide is made of a magnetic material and the guiding device is made of a ferromagnetic material.

16. The portable electronic device of claim 6, wherein the dynamic slide is made of a ferromagnetic material and the guiding device is made of a magnetic material.

17. The portable electronic device of claim 6, wherein the dynamic slide and the guiding device are made of a magnetic material, and adjacent surfaces thereof possess different polarities.

18. The portable electronic device of claim 6, wherein the multi-directional sliding module further comprises:

a third opening formed on the second track;

a second dynamic slide; and a second guiding device for guiding the second dynamic slide into the second track through the third opening while the second dynamic slide is aligned with the third opening.

19. The portable electronic device of claim 18, wherein the second track further comprises a fourth opening formed thereon for allowing the second dynamic slide to escape therefrom.

20. The portable electronic device of claim 19, further comprising a wedge-shaped block disposed above the second opening for pushing the dynamic slide out of the second track while the dynamic slide is aligned with the second opening.

21. The portable electronic device of claim 6, wherein the first track, the second track and the third track are formed on the single plane, and the third track is parallel to at least one of the first track and the second track.

22. The portable electronic device of claim 6, wherein the dynamic slide is attracted by the guiding device so that the dynamic slide is movable relative to the first electronic module and the dynamic slide is movable along the third track when the dynamic slide is guided into the third track.

* * * * *